United States Patent [19]
Rolker et al.

[11] 3,864,320
[45] Feb. 4, 1975

[54] MODIFICATION OF ACRYLATE POLYMERS BY TREATMENT WITH METAL CARBONYL

[75] Inventors: John H. Rolker, Altadena; Thomas C. Glasner, Los Angeles, both of Calif.

[73] Assignee: Bell and Howell Co., Chicago, Ill.

[22] Filed: Jan. 22, 1973

[21] Appl. No.: 325,492

[52] U.S. Cl. ........ 260/86.1 E, 260/75 T, 260/89.5 S
[51] Int. Cl. .......................................... C08f 27/00
[58] Field of Search .................... 260/89.5 S, 86.1 E

*Primary Examiner*—Melvin Goldstein
*Attorney, Agent, or Firm*—Nilsson, Robbins, Bissell, Dalgarn & Berliner

[57] ABSTRACT

A method of modifying polymers comprises contacting a selected normally non-reactive polymer with a catalyst in an inert atmosphere in a contacting zone. The catalyst comprises a metal carbonyl of a group VIII transition element, the contacting being effected for a time sufficient to change the characteristics of the polymer. Preferably, the carbonyl is selected from the group consisting of iron carbonyl, nickel carbonyl, cobalt carbonyl and mixtures thereof and most preferably iron pentacarbonyl is employed. The polymer contains saturated carbon chains having carboxylic groups. Novel modified polymer products are recovered.

9 Claims, No Drawings

MODIFICATION OF ACRYLATE POLYMERS BY TREATMENT WITH METAL CARBONYL

FIELD OF THE INVENTION

The present invention generally relates to polymers and more particularly relates to a method of modifying polymers and the novel products obtained thereby.

BACKGROUND AND SUMMARY OF THE INVENTION

Polymer chemistry has reached an advanced state, with many different types of polymers being produced in vast quantities for a wide variety of purposes. Many polymers comprise high molecular weight compounds formed by linking similar or dissimilar monomers together by an addition reaction. Polymers vary in physical characteristics, depending upon their nature and the extent of their polymerization. So-called fully polymerized polymers usually are substantially devoid of reactive sites for further polymerization and in any event are "normally non-reactive," that is, cannot be further polymerized or modified by conventional means.

Although the wide variety of currently available polymers affords a substantial selection regarding physical characteristics, nevertheless many potential applications await the development of polymers having the required characteristics. Therefore so-called "tailoring" of polymers by special, sometimes expensive, techniques during basic polymerization to build in new characteristics has not produced a sufficiently high number of new types and/or characteristics to suit current needs. Accordingly, it would be highly desirable to provide a simple, inexpensive method of providing new polymers and/or modifying existing polymers so as to enhance selected physical characteristics thereof.

The present invention is substantially as set forth in the Abstract above. In this regard, a simple, inexpensive and rapid method is provided for modifying normally non-reactive polymers, changing their characteristics and producing new polymer products. The method comprises contacting a selected fully polymerized polymer containing carboxylic groups, with a catalyst comprising a carbonyl of a group VIII transition element, preferably iron carbonyl, cobalt carbonyl, nickel carbonyl or a mixture thereof. The contacting is carried out in an inert atmosphere, such as nitrogen, until the desired modification is obtained. The resulting product is then recovered from the contacting zone and the catalyst can also be separately recovered for reuse.

Modified polymer products so produced exhibit such changed characteristics over the unmodified polymers as increased viscosity in solution, increased glass transition temperatures, gel-like states at greatly elevated temperatures, increased molecular weight, increased hardness and modified electrical and other properties. These products represent a substantial departure from conventional polymers and demonstrate the practicality of the present method.

Further features of the present invention will be apparent from the following detailed description.

DETAILED DESCRIPTION

In accordance with the method of the present invention, a selected polymer is modified by contacting it with a selected catalyst under suitable reaction conditions in a contacting zone.

The polymer used in the present method comprises a normally non-reactive polymer, that is, a polymer which has been polymerized to normal completion and has few, if any, reactive sites left. Such polymer cannot be further polymerized by conventional methods. However, further polymerization is effected by the present method.

The polymer starting material for the present method is characterized, in part, by being essentially saturated, that is, by being largely made up of saturated carbon chains which include carboxylic groups with alpha and beta carbon atoms adjacent thereto. Double and triple carbon-to-carbon atoms are totally or at least essentially absent. Thus, the polymer chains have structures which include the following:

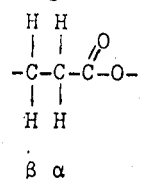

Representative types of suitable polymers for present purposes include saturated acrylic polymers having the following general structural formula for a homopolymer; that is, a polymer made from one monomer only:

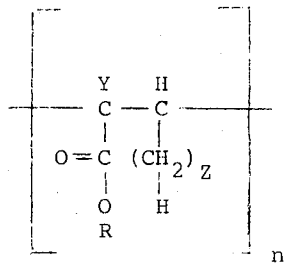

wherein R is a saturated organic radical, such as cycloaliphatic alkyl, alkyl, aryl and the like containing from 1 to about 20 carbon atoms, and Y is $CH_3$ or H, $n$ is an integer ranging from 3 to $10^6$, and Z is an integer from 0 to 12.

For a given R, Y and Z, we can represent the repeating entity as A. For other selections of R, Y and Z, the repeating entity can be represented by B, C, D etc. Thus, 2 or more monomers can be copolymerized into a polymer with A, B, C, D etc. arranged in regular or random form along the chain depending on the amounts and types of monomers used and the conditions of polymerization such as type and quantity of catalysts, presence of chain transfer agents, method of polymerization (bulk, suspension, solution or emulsion), temperatures used and the like.

An example of a homopolymer of this type is methyl methacrylate polymer having the following general structural formula:

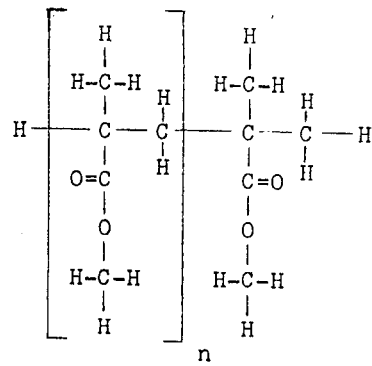

where $n$ is an integer.

Methyl methacrylate polymer can be formed by an addition reaction taking place through the double bond in each molecule of methyl methacrylate.

Another suitable example is ethyl methacrylate. Further suitable examples of this type include: lauryl methacrylate, hydroxypropyl methacrylate, t-butyl acrylate and ethyl acrylate.

A second type of polymer suitable for use in the present method are polyester polymers, whether of the alkyd or another class. Polyester resins generally comprise esters of poly-carboxylic acids and polyhydric alcohols formed by condensation reaction. Usually, the acids are dicarboxylic and the alcohols are diols or triols.

A typical linear saturated aliphatic polyester polymer may have the following general structural formula:

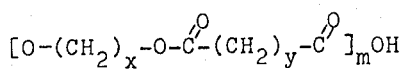

wherein $x$ and $y$ are integers of from about 1 to 24, and $m$ is an integer of from about 3 to 8000. Suitable examples of saturated polyester resins useful in the present method comprise ethylene glycol adipate polymer, butylene glycol succinate polymer and propylene glycol malonate polymer. Usually, the polymer is the reaction product of several dicarboxylic acids and dihydric alcohols, although polycarboxylic and/or polyhydric alcohols may also be present for cross-linking purposes.

Further types (and species thereof) of suitable saturated polymers containing the described carboxyl groups include: aromatic polyesters using aromatic acids such as polyethyleneglycol terephthalate, using aromatic alcohols such as poly dihydroxypropyl phenyl adipate, or combinations of both, or using bridged or unbridged cycloaliphatic polyhydric alcohols. Such alcohols are of increasing commerical importance. Polyesters made from one monomer such as poly ($\gamma$-butyrolactone) are common and well-known.

Other such types of polymers are well known to the art and reference can be made to Modern Plastics Encyclopedia, (McGraw-Hill, 1972), incorporated herein by reference.

The catalyst which is used in the present method comprises a metal carbonyl of a transition element, that is an element in Group VIII of the Periodic Table. Metal carbonyls selected from the group consisting of iron carbonyl, cobalt carbonyl, nickel carbonyl and mixtures thereof are preferred. The most preferred catalyst for present purposes is iron pentacarbonyl having the formula $Fe(CO)_5$. Iron pentacarbonyl can decompose at room temperature or below, boils at 103°C and at room temperature is a liquid. It is soluble in most organic solvents and in nickel tetracarbonyl. Other forms of iron carbonyl are iron tetracarbonyl, $[Fe(CO)_4]_3$, and iron nonacarbonyl, $Fe_2(CO)_9$, both of which are obtainable as crystals. However, they are less preferred for various reasons. For example, diferrocarbonyl is readily decomposed by heat.

Nickel tetracarbonyl having the formula $Ni(CO)_4$ can be used in the present method. It is soluble in alcohol and in many other organic solvents and has a boiling point of 43°C. It explosively decomposes at about 60°C if in the pure state.

Cobalt tetracarbonyl having the formula $[Co(CO)_4]_2$ is also suitable for use in the present method. It is soluble in ether, alcohol and carbon disulfide, has a melting point of 43°C and decomposes above 51°C.

The catalyst in the form of the selected metal carbonyl, in the present method, causes the polymer contacted therewith under reaction conditions to change its characteristics, i.e., the polymer becomes further polymerized, although it is essentially completely polymerized by conventional standards before such contact. The net result is a change in the physical characteristics of the polymer, usually with an increase in the glass transition point (Tg) of the polymer, an increase in molecular weight, an increased hardness and an increased viscosity in solution. Other changes also occur, depending on the starting materials, specific catalyst and reaction parameters.

The contacting can be carried out in any suitable contacting zone, for example, a closed reaction vessel in which a controlled atmosphere can be provided. In this regard, the contacting can take place in an inert atmosphere, for example, in the presence of nitrogen, helium, argon or the like. The gas does not enter into the reaction and precludes oxidation during the reaction.

The concentration of catalyst used in the method per unit weight of polymer may vary within wide limits, depending on the specific polymer, catalyst, reaction conditions, etc. Normally, the catalyst is present in a concentration of between about 0.1 and about 3 percent be weight of the polymer, although concentrations as small as about 0.01 and as much as about 7 percent or more by weight of the polymer can be used successfully without materially affecting the results. It has been found that weight ratios of catalyst-to-polymer substantially in excess of about 1:16 usually do not provide enhanced results over lower concentrations, so that in many instances, particularly with acrylic polymers, such weight ratio is a practical upper limit.

The polymer during the contacting step is present in a dispersed form, either as a molten liquid, when a thermoplastic polymer is involved, such as acrylic polymer, or else is dissolved or substantially completely dispersed in a solvent or dispersant which is non-reactive under the contacting conditions, in the case of thermosetting polymers such as polyesters. The use of a solvent is optional in the case of acrylic polymers. Such solvent may be, for example, a suitable organic solvent for the polymer, such as benzene, xylene, toluene, diethyl ether, dimethyl sulfoxide, dimethyl formamide, hexane, etc. The catalyst may be present as a liquid or gas or dissolved in a suitable solvent, such as ether, benzene, cumene, cyclohexanone, diethyl benzene, etc., depending upon the reaction temperature and particular catalyst selected. Depending upon the particular catalyst and polymer used, elevated, decreased or ambient temperature may be employed. The reaction can be carried out at any temperature at which the polymer, or solution thereof, is liquid. Generally one can use a reaction temperature of from about 40°C below to about 40°C above the metal carbonyl boiling point.

The reaction can be carried out in the contacting zone at about atmospheric pressure and utilizing suitable conventional contacting procedures, as by bubbling the catalyst in gaseous form through the molten polymer or polymer solution or dispersion. Conventional contacting aids, such as mechanical stirring means, may be used, if desired. Alternatively, the catalyst as a liquid, or dissolved in a solvent, can be stirred into and mixed with the dispersed polymer. The reaction can take place rapidly so that substantial changes in physical characteristics of the polymer can be obtained by contact times as little as 1 second. Normally, however, contact times of between about 5 minutes and about 24 hours are employed.

The contacting is carried out until substantial changes in the characteristics of the polymer are effected, after which the contacting is discontinued and the resulting modified polymer product is removed from the contacting zone and recovered ready for use. Depending upon the particular state of constituents, the means of separating the modified polymer from the catalyst will vary as more particularly described hereafter.

The following specific Examples further illustrate certain features of the present invention.

EXAMPLE I

Methacrylate polymer formed from methacrylate monomer and having an average molecular weight of about 200,000 is heated in a closed reaction vessel to about 130°C in xylene to render it a hot solution. The vessel is supplied with one atmosphere of nitrogen gas and contacting between the dissolved polymer and iron pentacarbonyl catalyst is then effected by bubbling the iron pentacarbonyl carried by nitrogen as a gas up through the molten polymer. The iron pentacarbonyl is bubbled through at a rate of about 10cc/min of $Fe(CO)_5$ per 100 g of solids of said polymer. The iron pentacarbonyl introduced to the polymer is at a temperature of about 25°C. Contacting between the iron pentacarbonyl and the polymer is carried out at about 130°C for about 30 minutes, after which the iron pentacarbonyl is flushed from the reaction vessel through a recovery exhaust line and the polymer is then drained in molten form from the reaction vessel, cooled in a closed zone to below its solidification point and recovered for use.

The modified polymer product thus recovered has a pseudo-melting point of about 320°C. Its viscosity is the same as the starting material, when in the same solvent at one-third the concentration of the starting material. Accordingly, its effective viscosity is greatly increased. Moreover, its hardness is increased. It is a gel-like solid at 300°C in contrast to the glassy transition temperature of the starting material of 105°C and its original melting point at 150°C. The molecular weight of the polymer product is increased to about 300,000. Accordingly, such product has substantially changed characteristics indicative of a higher degree of polymerization than that of the starting material.

Such polymer product is found to have improved utility for a variety of purposes, including high temperature resistant applications, for example, printed circuit boards, potting compounds and automotive parts.

EXAMPLE II

The procedure of Example I is followed, except that methyl methacrylate polymer of about 40,000 average molecular weight is substituted as the starting material. The catalyst, iron pentacarbonyl, is used in a concentration of about 7 percent by weight of the polymer, and the polymer and catalyst are heated to about 100°C and held at about that temperature in the reaction vessel during the contacting. A modified acrylic polymer is obtained having improved characteristics of the type referred to in Example I.

EXAMPLE III

Following the procedure of Example I, saturated acrylic terpolymer having an average molecular weight of about 20,000 is substituted for the starting polymer of Example I, the contacting temperature is about 80°C, and the concentration of iron pentacarbonyl is about 5 percent by weight of the polymer. The modified polymer product has improved characteristics of the type as referred to in Example I.

EXAMPLE IV

Modification of saturated ethyleneglycoladipate polyester having an average molecular weight of about 5,000 is carried out in accordance with the method set forth in Example I, except that the polymer is initially dissolved in benzene and is contacted in the dissolved state in the benzene at about 70°C with liquid iron pentacarbonyl as a catalyst. The catalyst is used in a concentration of about 5 percent by weight of the polymer and the polymer is present in the benzene in a concentration of about 30 volume percent. Nitrogen is used as an inert atmosphere in the closed reaction vessel and mechanical stirring is effected to promote the rate reaction. Contacting is carried out for about 16 hours, after which the temperature of the system is increased sufficiently to drive off the benzene as a gas, iron pentacarbonyl being removed as a liquid, leaving the modified polymer product as a solid. A polymer product is obtained having modified characteristics of the type referred to above as compared to the untreated polymer.

In parallel runs, poly[ethyleneglycol phthalate], poly[butylenegtyed adipate] and poly[di hydroxyethyl phenyl adipate], all saturated fully polymerized polyester polymers, can be substituted for the poly[ehtyleneglycal adipate], and in each instance the modified products exhibiting improved characteristics.

EXAMPLE V

Iron pentacarbonyl is first dissolved in liquid nickel tetracarbonyl at a temperature of approximately 30°C, the concentration of iron pentacarbonyl in the nickel tetracarbonyl being about 10 weight percent. This reaction liquid is then passed into contact with an acrylic polymer-containing benzene solution in the previously described reaction vessel under a nitrogen blanket at about 30°C. The acrylic polymer is formed from ethylacrylate. The catalyst mixture is present in a concentration of about 5 percent by weight of the polymer and the polymer is in a concentration of about 20 percent by volume of the benzene. Such polymer is saturated and has an average molecular weight of about 50,000. Stirring of the resulting liquid is carried out while the reaction zone is maintained at about 30°C until the reaction is completed in about 160 hours, after which the temperature in the zone is increased to about 45°C to strip off the nickel tetracarbonyl as a gas. The solution temperature is then increased to about 90°C to boil off the benzene, after which the iron pentacarbonyl is washed off with hexane and the polymer recovered. The modified polymer product is found to have modified physical characteristics of the type referred to above as compared to the untreated polymer.

In place of the iron carbonyl referred to in Example I, one can use equivalent amounts of cobalt tetracarbonyl or nickel tetracarbonyl.

Parallel runs to the foregoing can be made using polymethyl methacrylate, polyvinyl acetate, or poly[ethyleneglycol adipate] as the starting polymer to produce comparable results in upgrading physical characteristics of such polymer.

A method has been disclosed for altering the characteristics of saturated fully polymerized polymers containing carboxyl groups. The novel polymer products of the present method represent a substantial advance in the art. Such products are useful in protective formulations, structural applications, and as molded and otherwise formed finished articles as a substitute for the unmodified polymers. Other useful applications include adhesives, potting compounds, binders in inks, magnetic tape, paper, and reinforced concrete.

The present method is simple, inexpensive and rapid and can be carried out with a minimum of equipment and steps. The catalyst employed is recoverable by conventional procedures and is reusable. Moreover, the present method is applicable to a variety of polymers meeting the requirements set forth herein.

Various changes, alterations and additions can be made in the present method, its steps and parameters and in the new polymer products of the method. All such changes, alterations and additions as are within the scope of the appended claims form part of the present invention.

We claim:

1. A method of modifying polymers which method comprises contacting a selected normally non-reactive thermoplastic polymer with a selected catalyst in a contacting zone, said polymer being a homopolymer or copolymer consisting essentially of the structural formula:

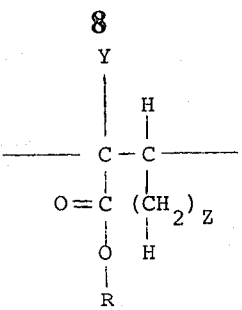

wherein R is an alkyl, cycloaliphatic alkyl or aryl radical containing from 1 to about 20 carbon atoms, Y is $CH_3$ or H, and Z is an integer from 0 to 12, said catalyst comprising a metal carbonyl of a group VIII transition element, said contacting being affected for a time sufficient to change the characteristics of said polymer, and recovering the resulting modified polymer from said contacting zone as a new product.

2. The method of claim 1 wherein said contacting is effected in an inert atmosphere and wherein said polymer is saturated and normally fully polymerized.

3. The method of claim 2 wherein said carbonyl is selected from the group consisting of iron carbonyl, cobalt carbonyl, nickel carbonyl and mixtures thereof.

4. The method of claim 3 wherein said carbonyl comprises iron carbonyl.

5. The method of claim 4 wherein said carbonyl comprises iron pentacarbonyl.

6. The method of claim 1 wherein said polymer comprises an acrylic polymer.

7. The method of claim 3 wherein said polymer comprises an acrylic copolymer.

8. The method of claim 5 wherein said polymer comprises an acrylic copolymer and wherein said iron pentacarbonyl is in a weight ratio to said copolymer not substantially in excess of about 1:16.

9. The method of claim 8 wherein said copolymer is a methacrylate copolymer, wherein said inert atmosphere comprises nitrogen, and wherein said copolymer is in a dispersed state during said contacting.

* * * * *